Patented Dec. 23, 1924.

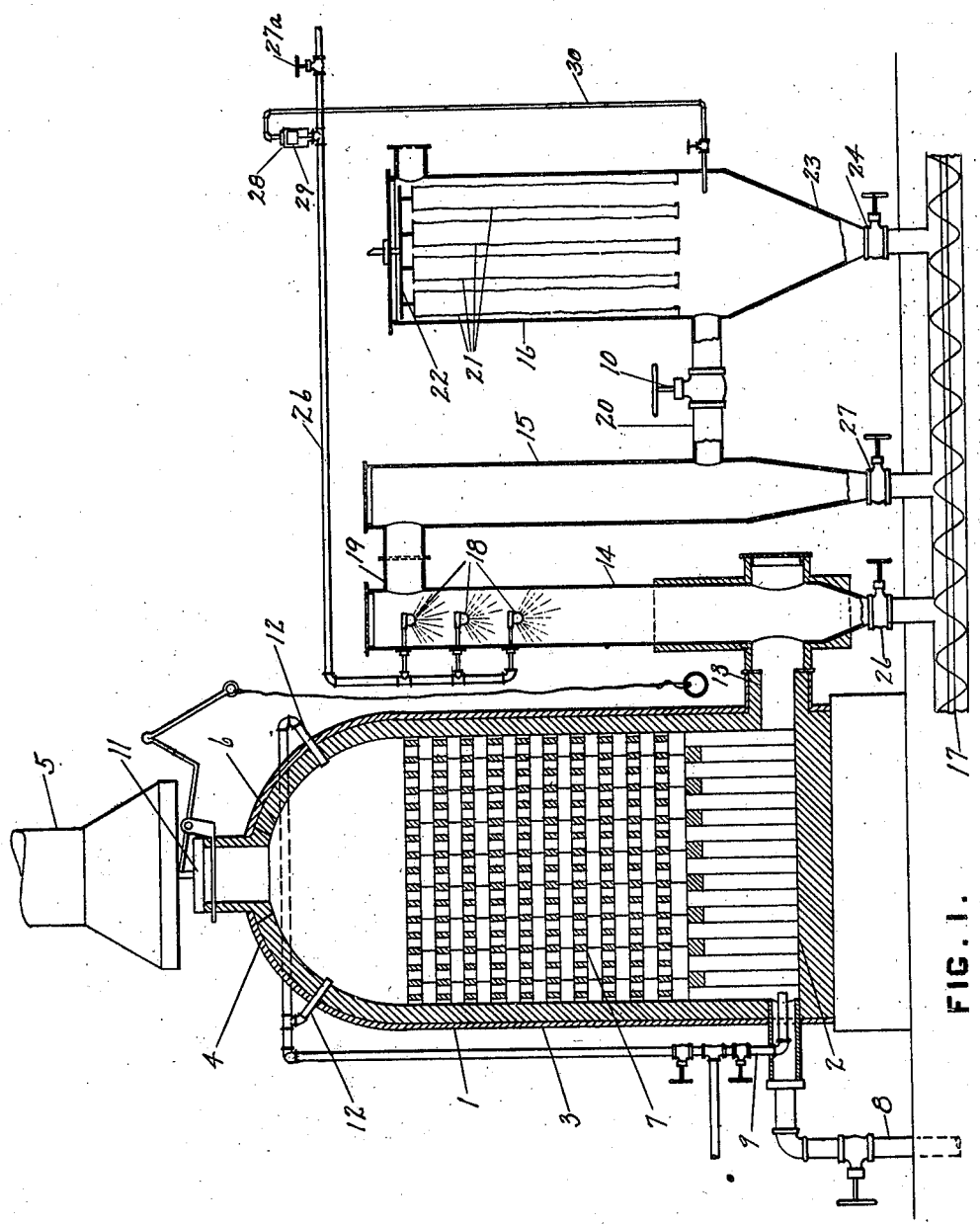

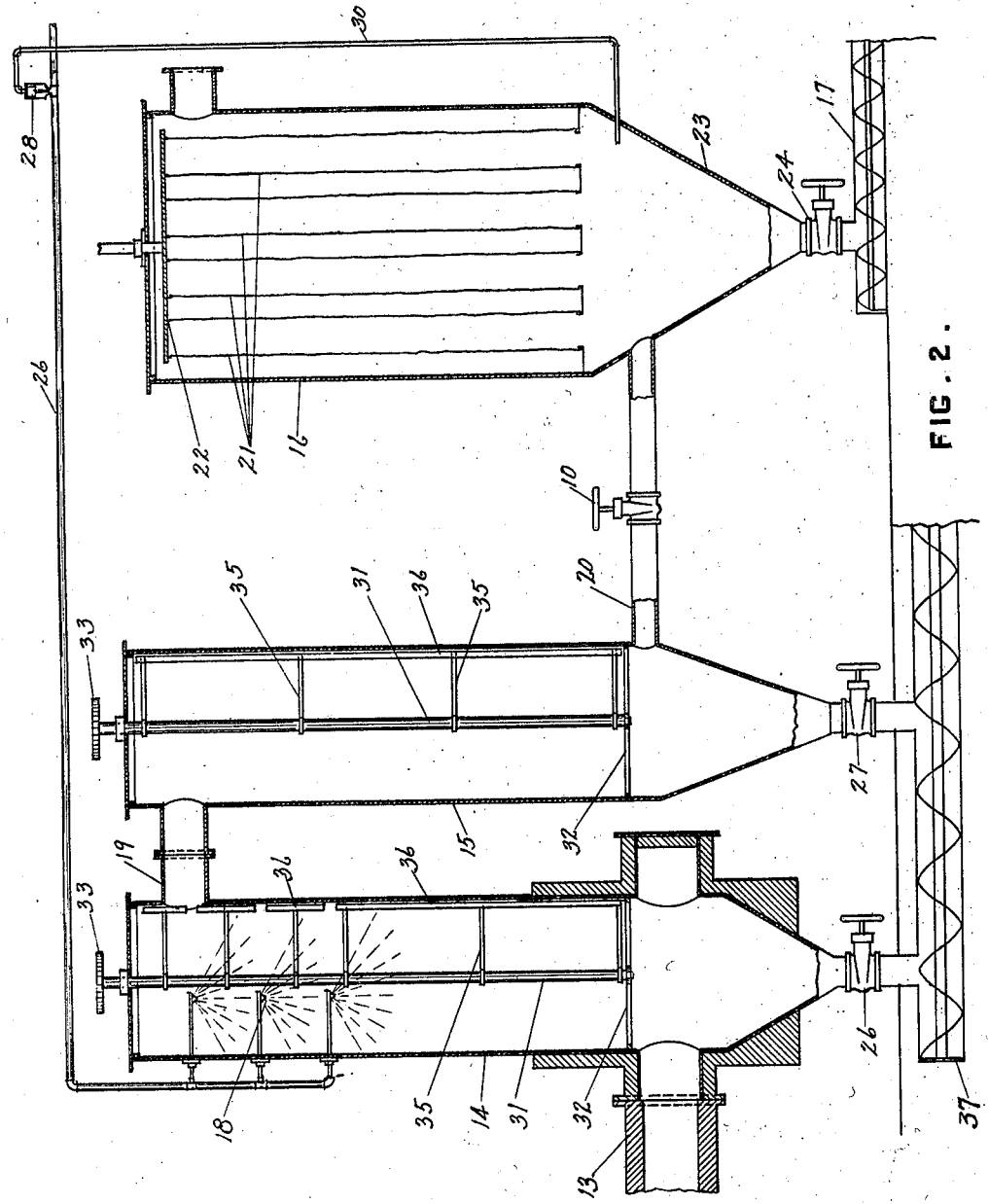

1,520,115

UNITED STATES PATENT OFFICE.

ROY H. BROWNLEE AND ROY H. UHLINGER, OF PITTSBURGH, PENNSYLVANIA, ASSIGNORS TO THERMATOMIC CARBON COMPANY, OF PITTSBURGH, PENNSYLVANIA, A CORPORATION OF DELAWARE.

APPARATUS FOR THE INSTANTANEOUS COOLING OF MIXTURES OF GAS AND SOLIDS.

Application filed May 19, 1922. Serial No. 562,219.

*To all whom it may concern:*

Be it known that we, ROY H. BROWNLEE and ROY H. UHLINGER, citizens of the United States, residing at Pittsburgh, in the county of Allegheny and State of Pennsylvania, have invented a new and useful Improvement in an Apparatus for the Instantaneous Cooling of Mixtures of Gas and Solids, of which the following is a specification.

This invention relates to apparatus for the instantaneous cooling of mixtures of gas and solids.

In certain instances, as for example with a mixture of gas and carbon black as produced in a furnace or the like it is highly desirable to effect an instantaneous cooling of the carbon black rather than to lead it through long externally cooled conduits. This is because the carbon black tends to collect on the inner wall of any such conduit, necessitating frequent and difficult cleaning of the conduit, and resulting in the deterioration of such carbon black as may come into contact with the wall of the conduit while it is still in a highly heated condition. This special advantage of the apparatus of the present invention when comprised in a plant for the production of carbon black is also set forth in the application of Roy H. Brownlee and Roy H. Uhlinger for an improvement in a method for the production of carbon black Serial No. 542,303 filed March 9, 1922. It will be readily appreciated, however, that the device of the present invention can be advantageously used in any connection in which air or a heated mixture of other gas and a finely divided solid may advantageously be cooled abruptly and without coming into contact with any surface upon which it may collect prior to such cooling.

One object of the invention is to provide apparatus which subjects a mixture of gas and finely divided solid or solids to an instantaneous cooling action.

A more specific object of the invention is to effect a cooling of a mixture of gas and finely divided solids by the direct contact of such mixture with a cooling liquid.

A further object of the invention is to maintain the temperature of the mixture of gas and solid above the boiling point of the liquid utilized for cooling the mixture; and to insure such temperature regulation by regulating the quantity of cooling spray supplied from the final means for separating the solid from the carrying gas.

In the accompanying drawings Figure 1 shows in vertical section the apparatus comprising the device of the present invention in conjunction with a furnace or retort for the production of a suitable hydrocarbon; and Figure 2 shows in vertical section the cooling and separating apparatus alone with certain modifications over the structure shown in Figure 1.

In the drawings the reference numeral 1 designates generally the furnace, which comprises a bottom wall 2, side and top walls 3 and 4, a stack 5, an arch 6 and checkerwork 7 of a refractory material capable of continued use at high temperatures.

In conducting a process for the production of carbon black, as more fully set forth in the application above referred to, air and a combustible gas are admitted to the lower portion of the furnace by means of a valved air pipe 8 and a valved gas pipe 9; the valve 10 in the cooling and separating apparatus being closed, and the valve 11 in the stack 5 being open. When the temperature of the furnace has been raised to from twelve hundred degrees to fourteen hundred degrees centigrade the gas is admitted to the upper portion of the furnace by means of branch pipes 12; the admission of gas for combustion in the furnace having been previously cut off, the stack valve 11 closed, and the valve 10 in the cooling and separating apparatus opened.

The hydrocarbon to be decomposed is thus passed downwardly through the highly heated checkerwork 7, and passes by way of a short conduit 13 into the spray tower 14 of the cooling apparatus.

It is the apparatus for cooling the mixture of hot gases and entrained solid carbon black as they issue from the furnace, and for separating carbon black from the carrying gases, which constitutes the subject matter of the invention to be claimed herein. Such apparatus comprises primarily the spray tower or chamber 14, the mixing tower or chamber 15 connected therewith, the separating chamber 16, and a conveyor 17 for conducting the separated solid to any suitable container.

As the hot mixture of solid carbon black and the carrying gas passes upwardly through the spray tower or chamber 14, it is met by liquid from the spray nozzles 18, which are so directed that sprays of cooling liquid are delivered counter to the stream of gas and carbon black. The carbon black is thus cooled from a temperature approximating or in excess of twelve hundred degrees centigrade to a temperature not in excess of two hundred degrees centigrade.

The mixture then passes by way of a short connection 19 into the mixing tower or chamber 15, and in their passage downwardly through this chamber the temperature of the mixture is equalized throughout the entire volume thereof. The mixture then passes by way of a conduit 20, in which is disposed the valve 10, into the separating chamber 16. In the separating chamber the carbon black is separated from the carrying gases by means of a plurality of bags 21, preferably of wool, through which the gases pass and by which the carbon black is separated and retained. These separating bags 21 are mounted on a suitable frame 22, which may be agitated from time to time to dislodge the collected carbon black from the bags 21. When dislodged from the bags this separated carbon black falls in a hopper 23, from which it may be drawn off by way of a valved connection 24 into a screw conveyor 17 for conducting the carbon black to any suitable storage receptacle. As shown in Figure 1 of the drawings, the cooling chamber 14 and mixing chamber 15 are provided with valved connections 26 and 27 respectively, by way of which carbon black deposited in these chambers may be drawn off to the screw conveyor 17.

As it is highly desirable that the carbon black be free from moisture when delivered, means are provided for maintaining the carbon black and the gases in the separating chamber at a temperature above the boiling point of the liquid used as a cooling medium. This is effected by regulating the quantity of cooling liquid delivered in accordance with the temperature within the separating chamber 16.

As shown the pipe 26 for supplying cooling liquid to the chamber 14 is provided with a manually operable valve 27ª for completely cutting off the supply of liquid to the spray nozzles 18, and with a thermally operated valve 28. This valve 28 is directly operated by suitable mechanism 29, which is in turn operated by a column of a suitable liquid contained in a tube 30 extending into the separating chamber 16. It will be obvious that such apparatus may be so arranged as to decrease the supply of liquid passing to the spray nozzles 18 with a drop in the temperature within the separating chamber 16. When, as is usual, water is employed as the cooling medium, the quantity of water delivered will be such that the temperature of the carbon black and carrying gases upon leaving the cooling chamber will be between one hundred degrees centigrade and two hundred degrees centigrade. Such temperature represents the greatest cooling of the carbon black which may be effected while insuring that all of the water delivered is converted into steam. If liquids having higher or lower boiling points be employed as the cooling medium, the regulating apparatus may be set accordingly.

Figure 2 of the drawings illustrates a modification in the cooling apparatus. In this modification the cooling tower 14 and the mixing tower 15 are each provided with vertical shafts 31, rotatably mounted in frames 32. At their upper extremities the shafts 31 are provided with means for rotating them, such means being shown as sprockets 33 arranged to engage any suitable sprocket chain. To each of the shafts 31 are secured arms 35 which carry scrapers 36 arranged to bear against the inner walls of the cooling and mixing towers. These scrapers 36 remove from the inner walls of the towers any carbon which may adhere thereto in the passage of the mixture of the carbon black and carrying gases therethrough. As shown in this modification, such carbon black is not of as high grade as the carbon black deposited in the separating chamber, and is delivered into a screw conveyor 37 separate from the conveyor 17 which receives the carbon black collected in the separating chamber.

It will be seen that the apparatus of the present invention is capable of cooling the carbon black without passing the same through a long cooling chamber or permitting it to come into contact with any surface while it is still in a highly heated condition, thus avoiding deterioration of the carbon black and effecting an efficient cooling thereof. It further delivers the carbon black in a dry condition, free from any moisture produced by the method of its cooling.

Water is the most desirable cooling medium, not only for the sake of economy and convenience, but also because of its high heat of vaporization. Because of its high latent heat a relatively small quantity of water suffices to effect the desired lowering in the temperature of the mixture when such water is brought into direct contact with the hot gases and solids. Thus the quantity of water delivered by the cooling sprays need be approximately only one tenth that which would be required to effect an equal reduction in temperature by means of a jacketed conduit with a circulation of cooling water through the jacket. If a liquid other than water be delivered to the spray nozzles such liquid is preferably one also having a high latent heat of vaporization in order that a great quantity of heat may be absorbed relatively to the quantity of liquid delivered.

It is to be noted that, as stated above, the apparatus of the present invention may be employed in various connections other than in conjunction with apparatus for the thermal production of carbon black, but that it may be employed with equal advantage in other connections where the rapid cooling of gases or of a mixture of gases and comminuted solids is desirable.

As the device shown and described is, moreover, susceptible of a number of modifications without departing from the spirit of the invention embodied therein, the scope of the invention is to be restricted only by the limitations contained in the claims appended hereto.

What we claim is:

1. Apparatus for recovering minute solids from a mixture of heated gases and such solids comprising a cooling chamber, a chamber for separating such solids from the gases, means for passing such mixture through said cooling chamber into said separating chamber, means for delivering a spray of cooling liquid into said cooling chamber, and thermostatically operating means arranged to vary the quantity of cooling liquid delivered in direct ratio to temperature variations within the separating chamber to insure a temperature within the separating chamber no lower than the boiling point of the cooling liquid.

2. Apparatus for recovering minute solids from a mixture of heated gases and such solids comprising a cooling chamber, a chamber for separating such solids from the gases, means for passing such mixture through said cooling chamber into said separating chamber, means for delivering a spray of cooling liquid into said cooling chamber, thermostatically operating means arranged to vary the quantity of cooling liquid delivered in direct ratio to temperature variations within the separating chamber to insure a temperature within the separating chamber no lower than the boiling point of the cooling liquid, and manually operable means for cutting off the supply of liquid from said spray.

In witness whereof, we hereunto set our hands.

ROY H. BROWNLEE.
ROY H. UHLINGER.

Witnesses:
R. M. GAUGHAN,
EDNA B. WALTERS.